Nov. 17, 1964
M. O. GROAT
3,157,426
VEHICLE FOR TRANSPORTING COMPONENTS OF
PREFABRICATED BUILDINGS AND THE LIKE
Filed Sept. 26, 1963
2 Sheets-Sheet 1
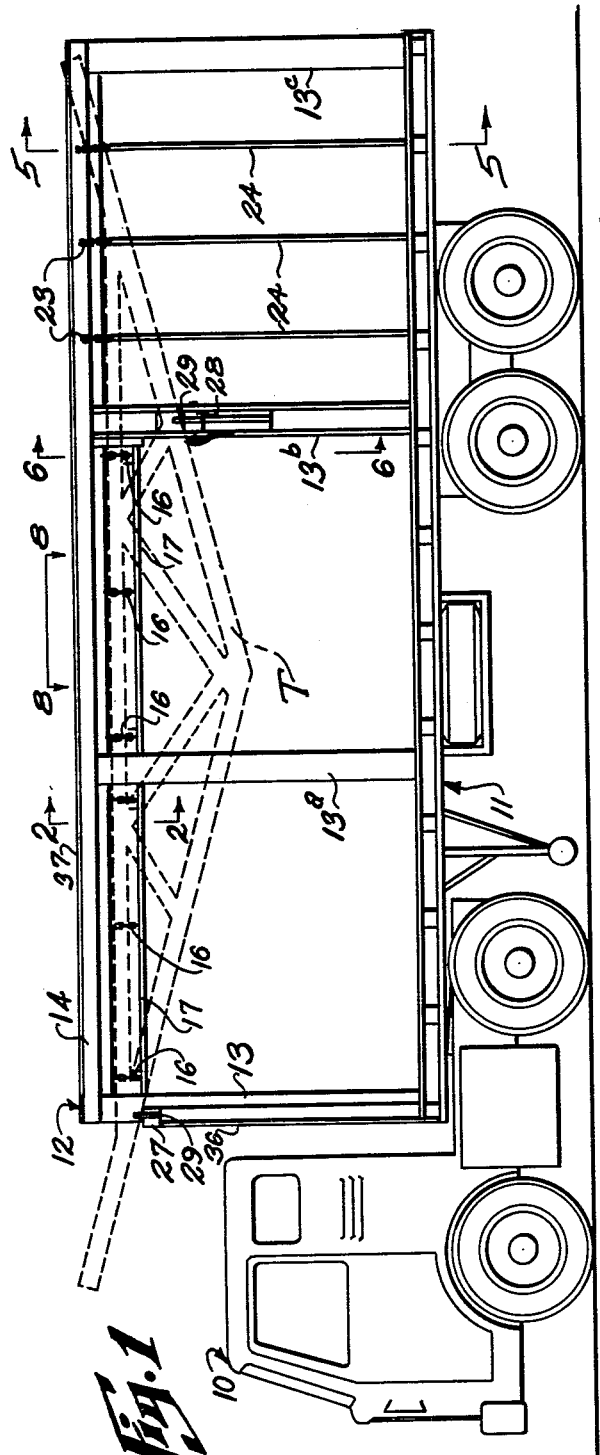
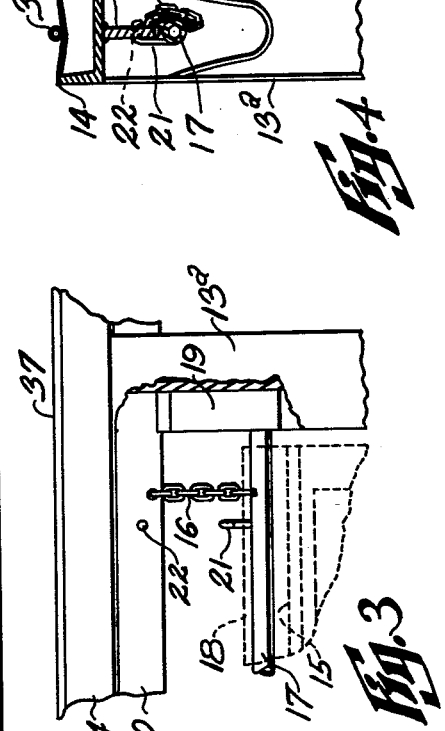
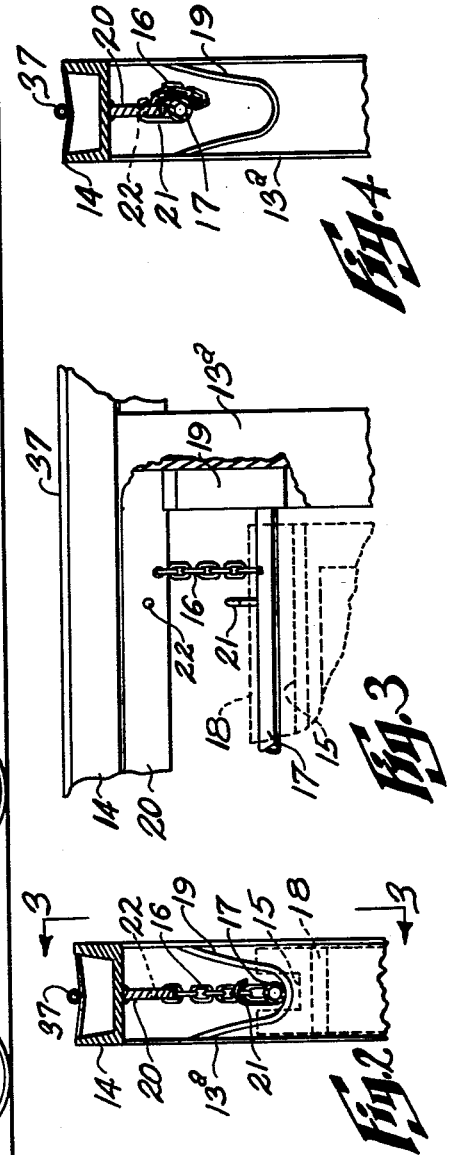
INVENTOR.
Marshall O. Groat
BY Jennings, Carter & Thompson
Attorneys Nov. 17, 1964 M. O. GROAT 3,157,426
VEHICLE FOR TRANSPORTING COMPONENTS OF
PREFABRICATED BUILDINGS AND THE LIKE
Filed Sept. 26, 1963 2 Sheets-Sheet 2

INVENTOR.
Marshall O. Groat
BY Jennings, Carter & Thompson
Attorneys

United States Patent Office 3,157,426
Patented Nov. 17, 1964

3,157,426
VEHICLE FOR TRANSPORTING COMPONENTS OF PREFABRICATED BUILDINGS AND THE LIKE
Marshall O. Groat, Fort Payne, Ala., assignor to Kingsberry Homes Corporation, a corporation of Delaware
Filed Sept. 26, 1963, Ser. No. 311,820
2 Claims. (Cl. 296—3)

This invention relates to a vehicle such as a truck trailer, railway car, or the like, adapted to carry the components of prefabricated buildings and the like from the factory to a construction site.

More particularly this invention relates to a flat decked vehicle adapted to carry roof trusses, wall panels, door frames, sheathing material, roofing material and related hardware.

A primary object of my invention is to provide a vehicle of the character designated that may be loaded and unloaded quickly and with a minimum of effort.

Another object is to provide a vehicle of the character designated that affords safe handling of components in loading and unloading and protects the components from damage during loading, transporting, and unloading of the same.

A further object of this invention is to provide a vehicle of the character designated that can be loaded in a manner such that materials are accessible from both sides as required in the sequence of construction.

My invention contemplates providing a truck body or vehicle having a flat deck upon which is carried a spine-like superstructure comprising vertical columns connected at their upper ends by a horizontal beam member. This spine-like superstructure provides the support for the building components and for other support members which are adapted in specialized manner to support certain specific components. The spine extends along the longitudinal center line of the flat deck. The vertical columns are spaced apart thereby forming a number of bays within which such components as door frames may be loaded or roofing material may be stacked. Restraining means is provided in the bays within which door frames are loaded whereby the door frames will be restrained against lateral tilting relative to the truck body in the event the truck body should tilt or lean to one side. Vertical restraining members are provided on either side of the longitudinal center of the vehicle adjacent the bays within which roofing material or the like will be stacked thus preventing shifting of such material in transit.

Roof trusses and the like are supported on tranversely extending horizontal arms, one of which is rigidly secured to one of the vertical columns and another of which is secured to another of the vertical columns in such a manner that its vertical position may be varied in order that trusses of different sizes and slopes may be carried conveniently on the vehicle.

Apparatus embodying features of my invention is illustrated in the accompanying drawing, forming a part of this application, in which:

FIG. 1 is a side elevational view of a truck and trailer showing the general relationship of the various components of my invention and showing in dashed lines a truss in position on the support arms;

FIG. 2 is a detail sectional view taken generally along line 2—2 of FIG. 1, partly broken away;

FIG. 3 is a detail view taken generally along the line 3—3 of FIG. 2, partly broken away and in section;

FIG. 4 is a detail sectional view taken generally along line 2—2 of FIG. 1 and showing the restraining bar in stored position;

Figure 6:
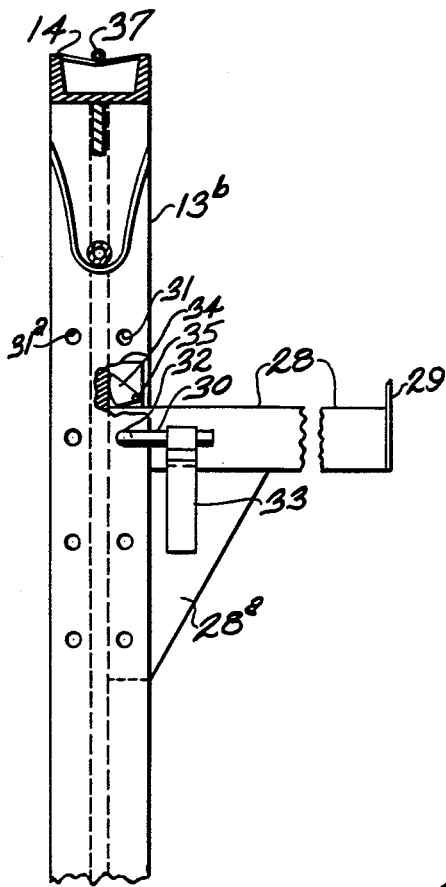
FIG. 6 is a detail view taken generally along line 6—6 of FIG. 1, partly broken away and in section.

Referring now to the drawings for a better understanding of my invention I show a truck having a cab 10 and a flat deck trailer 11 upon which is constructed superstructure embodying features of my invention. The spine of the trailer indicated generally by the numeral 12 comprises a row of longitudinally spaced apart vertical columns 13, 13ª, 13ᵇ and 13ᶜ connected adjacent their upper ends by a beam member 14.

Depending from the beam member 14 are a plurality of flexible members 16, such as chains. In the truck illustrated the flexible members 16 depend from the beam 14 within two bays, and carry at their lower ends within each bay a bar-like member 17. As is more clearly shown in FIG. 2 each bar-like member 17 is adapted to fit within a horizontal groove 15 formed by the head members at the top of the door frame 18 shown in dotted lines. Each bar-like member 17 is restrained from lateral motion by a guide member 19 or alternately by the flanges of the column, whereby in the event the trailer should tilt the door frame will be restrained from tilting laterally relative to the trailer because the head members of the door frame 18 will come into contact with the bar-like member 17 and thus limit lateral movement. FIG. 3 shows in elevation the components illustrated in FIG. 2. A hook 21 is attached to the bar 17 adjacent each end thereof and is adapted to fit into a hole 22 provided in a depending flange-like member 20 secured to the beam 14 thus holding the bar 17 up out of the way when the bar is not being used, as illustrated in FIG. 4.

Figure 5:
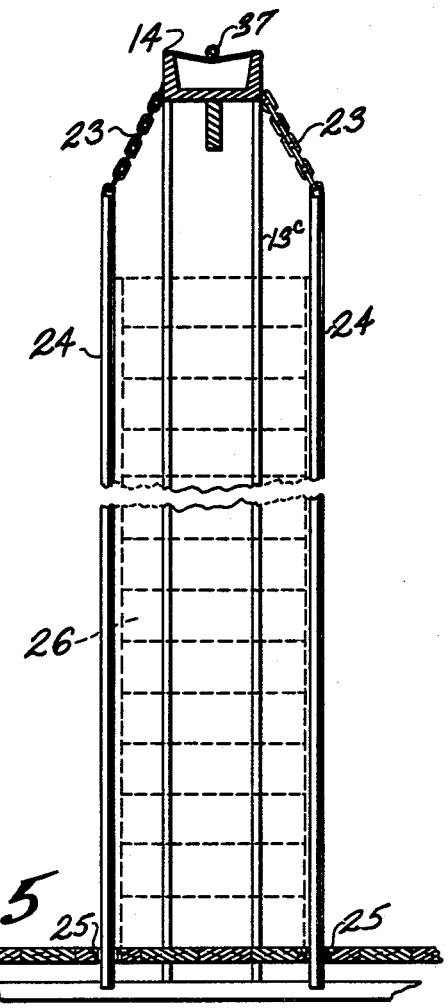
FIG. 5 is a sectional view taken generally along line 5—5 of FIG. 1, partly broken away.

As shown in FIG. 5 other flexible members 23 are attached to and depend from either side of the beam 14 adjacent at least one bay of the spine of the trailer. On the lower ends of the flexible members 23 are secured rod-like load restraining members 24 which extend substantially parallel to each other downwardly, passing through sockets 25 in the floor of the deck. In operation members 24 on one side of the trailer are inserted into the sockets 25 on that side of the trailer while the members 24 on the other side of the trailer are lifted up out of the way while roofing material 26 or similar material is stacked within the bay. After the material 26 is stacked within the bay as indicated by the dotted lines in FIG. 5 the other bar members 24 are inserted into the other sockets 25 thus enclosing the material 26. The material 26 is thus restrained from shifting during transit.

The transport of prefabricated roof trusses in vehicles of this type present problems particularly in loading and unloading. In my invention I provide two transversely extending horizontal support arms 27 and 28 which are secured to separate columns, 13 and 13ᵇ, of the spine. Trusses T may then be loaded by means of a fork lift truck or a similar device by lifting them to the position shown in dotted lines in FIG. 1. The foremost of the horizontal support arms 27 is rigidly secured to the first column 13 of the spine. The rearmost horizontal support arm 28 is, however, secured to another column 13ᵇ by means that allows vertical adjustment to selected positions in order that trusses of different sizes and slopes may be carried on the trailer. Thus the trusses are loaded before anything else is put on the trailer and there is room under, around and within the trusses for storing and loading other components and hardware. Upon unloading the vehicles the trusses may be removed either by machine or by hand as they are required in the process of construction. A vertically extending stop member 29 is provided on the ends of each support arm 27 and 28 to aid in holding the trusses in place.

A brace member 28ª is provided subjacent the innermost end of the arm 28 to strengthen the arm 28 and to aid in holding the arm in position under load. As shown in FIG. 6 the means for securing the member 28 to the column 13ᵇ may comprise vertically spaced holes 31 in the flanges of the column 13ᵇ through which a pin 32 may pass, there being a through opening adjacent the innermost end of the member 28 that corresponds to selected ones of the holes 31 in the column 13. To adjust the position of the member 28 the pin 32 will be removed and member 28 positioned so that the opening adjacent its innermost end would correspond to other of the holes 31 and the pin 32 be reinserted.

The pin 32 may be held from slipping out of the holes by a spring clasp 33 adapted to engage a bent end portion 30 of the pin 32. A cam-like member 34 may be pivotally connected as at 35 to the upper surface of the innermost end of the member 28 and adapted to wedge the member 28 into place thus securing it rigidly to the column 13ᵇ. By providing holes 31ª on the other side of the column 13ᵇ the member 28 may be put on either side of the column or another support member similar to the member 28 may be put on the opposite side of the column, whereby more trusses may be carried on the trailer.

Figure 7:
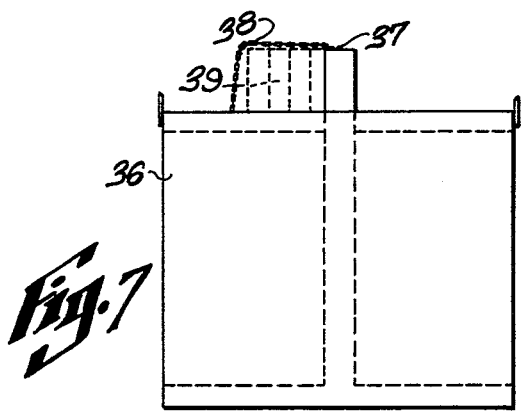
FIG. 7 is a front elevational view of the trailer.
Figure 8:
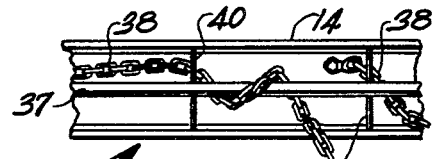
FIG. 8 is a fragmentary view taken generally along line 8—8 of FIG. 1.

A panel 36 is provided adjacent the front of the trailer, as shown in FIGS. 1 and 7, to protect the load from debris that may be thrown against the front of the trailer while in transit and to prevent any shifting of the load toward the cab of the truck.

A pipe or bar 37 is attached to transverse support members 40 which in turn are secured to upper portions of the beam 14. Chains or rope-like members are secured in place wrapping the same around the bar 37. The chains are employed for securing covers and the like to the load. Also, the chain 38 may be attached to the beam 14 and then attached by nails, staples or the like, to components of the load thus holding them in place on the trailer, as shown in FIG. 7 by the dotted lines at 39.

From the foregoing it is seen that I have provided a new and improved vehicle for transporting the components of prefabricated buildings and the like. A vehicle embodying my invention can be loaded and unloaded on each side simultaneously. It can be loaded in a manner such that materials are accessible from both sides as required in the sequence of construction. Trusses are loaded in a unit package by a fork truck or the like before other components are loaded and are easily accessible for unloading when required. Different sizes of trusses may be loaded for different jobs on the same truck and the truck is adapted to carry trusses on one or the other or both sides. Wall panels and partitions are loaded in a vertical position and are secured to the frame by means of chains which are rigidly secured to the frame and nailed to the partitions. Door frames and the like are held in vertical position between the columns of the spine and are prevented from shifting by means of the rod 17 that fits within the grooves of the door frame head members. Roofing material and other stackable material is held in place and prevented from shifting in transit by means of the vertical restraining rods 24 which extend downwardly along each side thereof. The horizontal and vertical restraining rods hold the doors and roofing material in place when the trailer is tilted, as, for instance, when the trailer is parked on the typical rough terrain at building sites and unloaded. In practice, the vehicle has been found to be highly satisfactory. There are no loose small components to be lost. The construction is rugged and simple and thus maintenance is cut to a minimum.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a vehicle for transporting components of prefabricated buildings and the like having a flat deck body with a longitudinally centered spine-like superstructure having bays between spaced apart vertical columns, the upper ends of which are connected by a horizontal beam,
   (a) a plurality of vertical disposed load restraining members spaced apart on either side of the longitudinal center of the vehicle adjacent at least one of said bays,
   (b) a plurality of flexible members depending from said beam and being connected to the upper ends of said vertically disposed members, and
   (c) there being sockets in the deck of the vehicle adapted to slidably receive the lower ends of said vertically disposed members.

2. A vehicle as defined in claim 1 which includes the further improvement of,
   (a) a horizontally disposed bar-like load restraining member extending longitudinally within at least one other of said bays, and
   (b) a plurality of flexible members depending from said beam and connected to said horizontally disposed member supporting same a predetermined distance above the deck of the vehicle.

References Cited by the Examiner

UNITED STATES PATENTS

| | | | |
|---|---|---|---|
| 1,231,874 | 7/17 | Gallanore et al. | |
| 1,294,707 | 2/19 | Roberts | 296—3 |
| 1,438,813 | 12/22 | Day | 296—3 |
| 2,448,172 | 8/48 | Couse | 296—28 X |
| 2,763,383 | 9/56 | McCoy | 296—28 X |
| 2,820,667 | 1/58 | Benaroya et al. | 296—24 |

FOREIGN PATENTS

| | | |
|---|---|---|
| 127,580 | of 1960 | Russia. |
| 341,377 | 1/31 | Great Britain. |
| 1,184,693 | 2/59 | France. |

A. HARRY LEVY, *Primary Examiner.*